United States Patent [19]
Johnson

[11] Patent Number: 5,309,289
[45] Date of Patent: May 3, 1994

[54] OPTICAL TARGET SYSTEM FOR TRAILER HITCH ALIGNMENT

[76] Inventor: Brady G. Johnson, 202 English Ave., Newark, Ohio 43055

[21] Appl. No.: 667,182

[22] Filed: Mar. 11, 1991

[51] Int. Cl.⁵ .......................... G02B 7/18; G01C 5/00
[52] U.S. Cl. .................................. 359/871; 359/872; 359/881; 359/903; 33/264; 248/467; 248/476; 280/477
[58] Field of Search ............... 359/871, 872, 881, 903; 248/467, 474, 476, 479, 495, 480; 280/477, 432; 33/264

[56] References Cited

U.S. PATENT DOCUMENTS

| | | | |
|---|---|---|---|
| 3,295,914 | 1/1967 | Dietrich | 359/881 |
| 3,524,701 | 8/1970 | Strohmeier | 248/467 |
| 3,670,423 | 6/1972 | Leber | 33/264 |
| 3,767,292 | 10/1973 | Rutkowski | 359/871 |
| 3,858,966 | 1/1975 | Lowell, Jr. | 359/881 |
| 4,156,972 | 6/1979 | Van Krevelen | 33/264 |
| 4,163,606 | 8/1979 | Granno | 359/881 |
| 4,856,200 | 8/1989 | Riggs | 33/264 |

Primary Examiner—Bruce Y. Arnold
Assistant Examiner—R. D. Shafer
Attorney, Agent, or Firm—Robert E. Stebens

[57] ABSTRACT

An optical target system is provided for facilitating a vehicle operator's effecting alignment of the respective hitch assembly components of a towing vehicle and a towed vehicle. The system includes first and second targets that are removably positionable in referencing relationship to respective ones of the hitch assembly components and a viewing mirror that is removably positionable on the towed vehicle to provide the vehicle operator positioned in the towing vehicle with a reflected view of the two targets. Each of the two targets includes a longitudinal guidance element that is disposed in alignment with the longitudinal axis of its respective vehicle and a transverse guidance element that is transversely oriented to the respective longitudinal guidance element and located above the hitch assembly component to provide a visual reference to a vertical axis extending through those components.

29 Claims, 9 Drawing Sheets

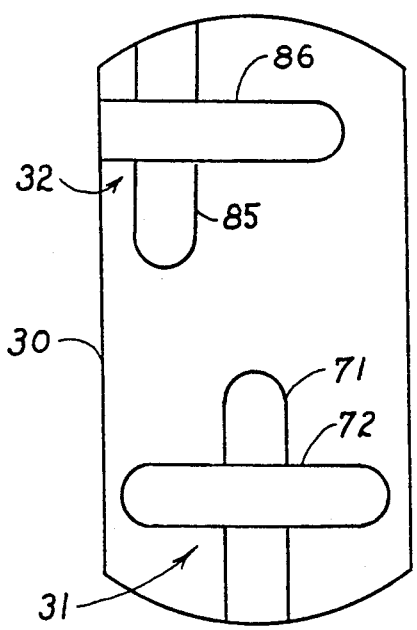 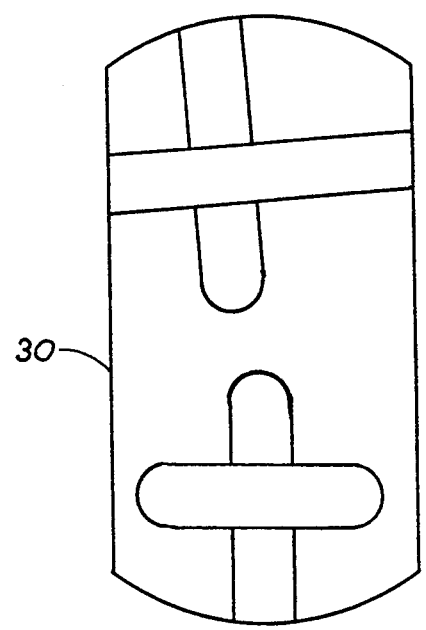
FIG.11  FIG.12
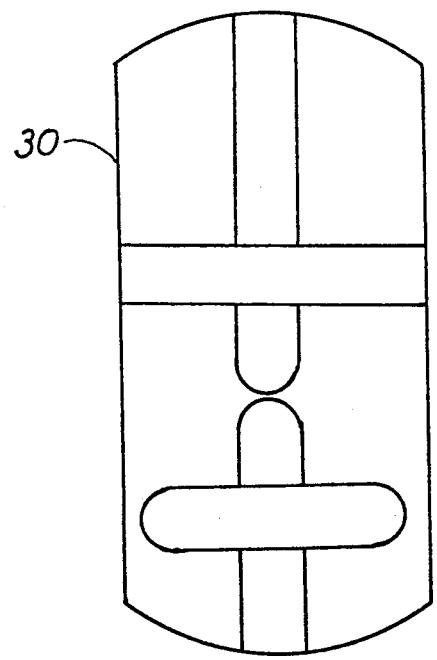 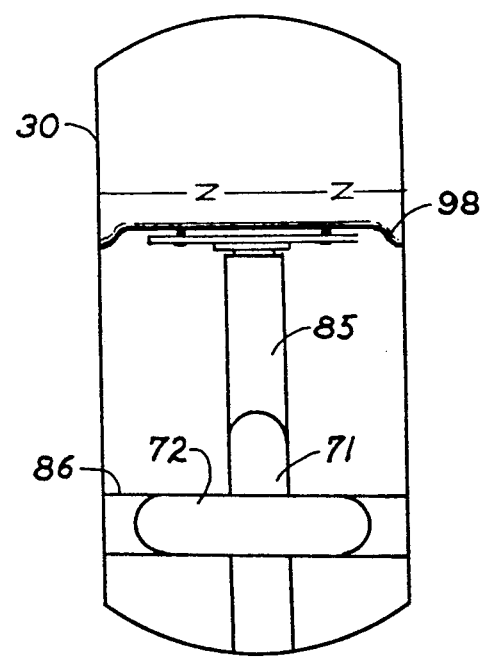
FIG.13  FIG.14

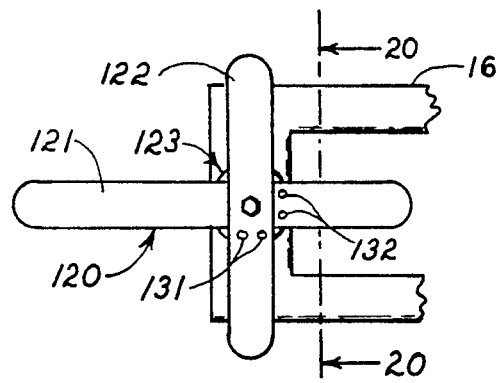
FIG.19
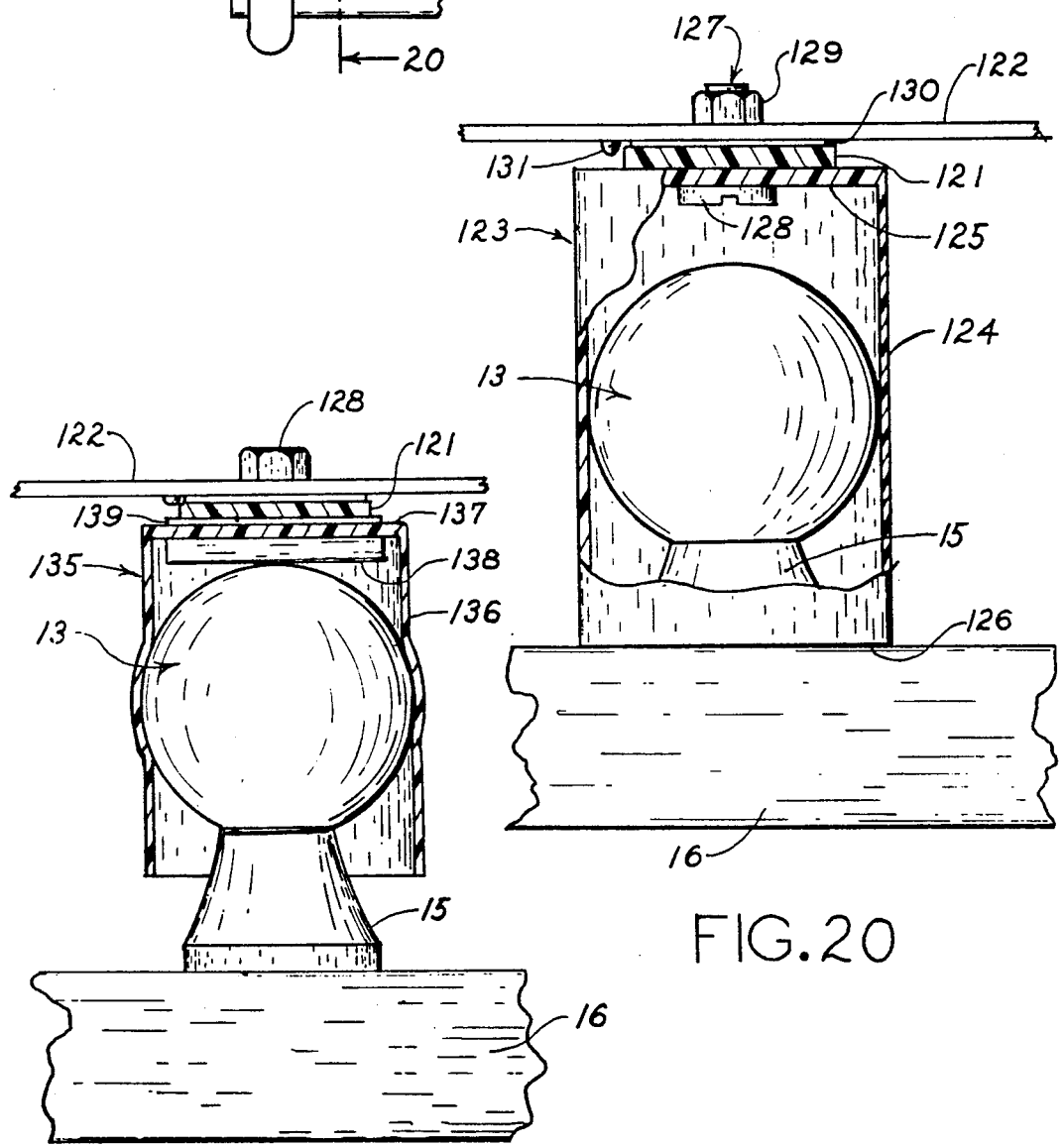
FIG.20
FIG.21

OPTICAL TARGET SYSTEM FOR TRAILER HITCH ALIGNMENT

FIELD OF THE INVENTION

This invention relates in general to an optical system for providing a visual reference to the operator of a vehicle to facilitate alignment of the respective components of a hitch assembly in interconnecting a towing vehicle to a towed vehicle. It relates more particularly to an optical target system having targets which are positionable in association with respective components of the hitch assembly and provide longitudinal guidance and transverse reference to the relative positions of the respective hitch assembly components and facilitating the operator's determination of vertical alignment of those components through use of an optical mirror system.

BACKGROUND OF THE INVENTION

Towing vehicles and towed vehicles such as automotive vehicles and trailers are mechanically interconnected by means of a hitch assembly which includes two components that are adapted to be mechanically interconnected, but which may be separated when it is desired to use the automotive vehicle separate and apart from the towed vehicle or trailer. A typical and common arrangement is an automotive vehicle utilized in towing of a recreational or other type of trailer where it is frequently desired to leave the trailer at a fixed location and to then separately use the automotive vehicle. The most usual type of hitch assembly utilized in this specific application is known as the ball and socket type hitch wherein a spherical ball element is mounted on a frame structure secured to the automotive vehicle or towing vehicle and the trailer is provided with a socket adapted to receive the ball and to mechanically secure the ball and socket in mechanical engagement. The particular problem to which this invention is directed is the maneuvering of the towing vehicle with respect to the trailer so as to align the ball and socket along a vertical axis whereby the trailer may be maneuvered to lower the socket onto the ball and effect the interconnection. The automotive vehicle is normally provided with its component of the hitch assembly at the rear with the operator being located a substantial distance forwardly thereof and out of direct visual contact with either that component of the hitch assembly or the socket component carried by the trailer. Consequently, the vehicle operator has substantial difficulty in maneuvering the automotive vehicle so as to effect the alignment of the two components and permit the interconnection.

One technique that is utilized to obtain the alignment of the hitch assembly components is the positioning of an observer at the rear of the automotive vehicle adjacent the front of the trailer who can visually signal the vehicle operator as to lateral and longitudinal displacement to position the ball in alignment with the trailer hitch assembly socket. An observer, however, is not always readily available and thus attempts have been made to facilitate the alignment process through techniques such as use of optical mirrors. An optical mirror system of a very basic form for such purposes is illustrated in U.S. Pat. No. 3,524,701 issued Aug. 18, 1970 to R. J. Stronmeier. That patent merely illustrates a device which includes a convex surface mirror mounted on a vertical standard that may be detachably secured to a component of the trailer at its forward end and to position the mirror at a vertical elevation where the operator of the towing vehicle may look rearwardly and view both the socket on the trailer and the ball coupling on the rear of the towing vehicle. The objective is to enable the operator to ascertain the relative locations of the spherical ball and the receiving socket. While a simple mirror system such as that shown in the noted patent provides a means for the vehicle operator to view the two components of the hitch assembly, such a system fails to provide any guidance information as to the direction of movement of the ball on the towing vehicle with respect to the trailer hitch socket. Alignment of the two components requires that the vehicle operator be aware of the direction of movement of the ball along a path that is related to the longitudinal axis of the vehicle. The disadvantage of simply using a mirror is that the vehicle operator is not apprised of the longitudinal axis along which the ball joint is traversing even though the vehicle operator may have a general view as to the orientation of the towing vehicle with respect to the trailer. Consequently, a slight angular differentiation as between the longitudinal axis of the towing vehicle as to the towed or trailer can result in a misalignment of the two components, and thus, necessitate a second attempt, or more, to effect the proper alignment.

Another significant deficiency of a simple mirror system such as that shown in the Strohmeier patent is the relative inability of such a structure to be readily adapted to the wide range of dimensional variations as between various models and manufacturers of trailers since the location of the front support jack assembly may be located at several diverse positions with respect to the hitch assembly socket. Strohmeier has attempted to solve that problem through suggesting that the support standard for the mirror be made of a material that permits it to be bent to different shapes so as to locate the mirror at different positions. However, the bending of a support standard necessarily is limited in its capability to properly locate the mirror as to any particular trailer and hitch assembly. Also, mounting of the support standard by means of a simple magnetic attachment to the post of the front support screw jack does not provide a great amount of versatility in appropriately locating the mirror at a proper elevation with respect to the different types of automotive vehicles. For example, bending the support standard so that it will locate the mirror in a more forward direction with respect to the jack stand necessarily results in placing the mirror at a lower elevation and that may significantly alter the viewing angle with respect to the vehicle operator for his particular vehicle and may adversely affect his ability to view the two hitch assembly components.

SUMMARY OF THE INVENTION

In accordance with this invention, an optical target system is provided which is capable of providing visual guidance reference to the vehicle operator as to the respective longitudinal axis of both the towing vehicle and the longitudinal axis of approach to the coupling socket mounted on the trailer in addition to providing enhanced reference to the alignment of those components in a transverse axis and to thereby provide the vehicle operator with both guidance as to the longitudinal and transverse alignment to indicate the vertical alignment of the components for enabling their assembly. A viewing mirror is provided to be located with respect to the trailer so as to provide the vehicle operator with visual operation of both the receiving hitch assembly socket on the trailer and the ball joint located on the approaching towing vehicle. Each of the hitch assembly components is provided with a target which have components related to the respective longitudinal axis of the respective vehicles as well as a transverse axis associated with the vertical orientation of the respective ball joint or receiving socket components. Each of the respective targets in general comprises elongated bar components disposed in horizontal planes that are orthogonally oriented with respect to each other and having a longitudinal element that is aligned with the respective direction of movement of the particular vehicle on which the hitch assembly component is mounted. These targets are visually perceptible in the mirror and thus the vehicle operator is provided with guidance information as to the longitudinal direction of movement of the towing vehicle with respect to the ball receiving socket mounted on the trailer. This longitudinal axis guidance information greatly facilitates the vehicle operator in ascertaining whether the direction of movement of the towing vehicle is appropriate with respect to the particular fixed location of the hitch assembly on the trailer. It is particularly advantageous that the two targets provide a visual reference to establish the exact point at which to stop the tow vehicle in order to place its spherical ball directly below the towed vehicle socket, thus providing accurate alignment of the two components of the hitch assembly.

In accordance with this invention, the respective components of the target system are designed to permit their ready accommodation to the various dimensional variations that are encountered as between different models and manufacturers of both the trailers and the automotive vehicles utilized in towing such trailers. The components of the apparatus of this invention which are adapted to be positioned on the trailer are designed, in particular, to enable location of the mirror at an optimum location, both vertically and horizontally, with respect to the line of the view of the vehicle operator and the vertical position above the coupling socket mounted on the trailer. For similar reasons, the target that is adapted to be positioned in operative relationship to the ball joint of the hitch assembly secured to the towing vehicle is adapted to be readily adjusted for proper location with respect to the position of that ball along the longitudinal axis of the towing vehicle.

The respective components of the system of this invention are also designed and constructed to enable their ready adaptation to the particular towing and towed vehicles and to permit them to be readily mounted on and removed from the respective vehicles.

These and other objects and advantages of this invention and the illustrative embodiments will be readily apparent from the accompanying detailed description of the embodiments and the accompanying drawings showing the structural embodiments of this invention.

DESCRIPTION OF THE DRAWING FIGURES

FIGS. 11-14 are diagrammatic representations of the respective target components of the trailer and towing vehicle as seen in the mirror by the operator of the towing vehicle during the course of maneuvering to effect alignment of the ball and socket components.

FIG. 19 is a top plan view of a modified second target.

FIG. 20 is a fragmentary elevational view on an enlarged scale of the modified second target with portions thereof broken away for clarity of illustration.

FIG. 21 is a fragmentary elevational view of a further modified second target of a type similar to FIG. 20 with portions thereof broken away for clarity of illustration.

DETAILED DESCRIPTION OF THE ILLUSTRATIVE EMBODIMENTS

Figure 1:
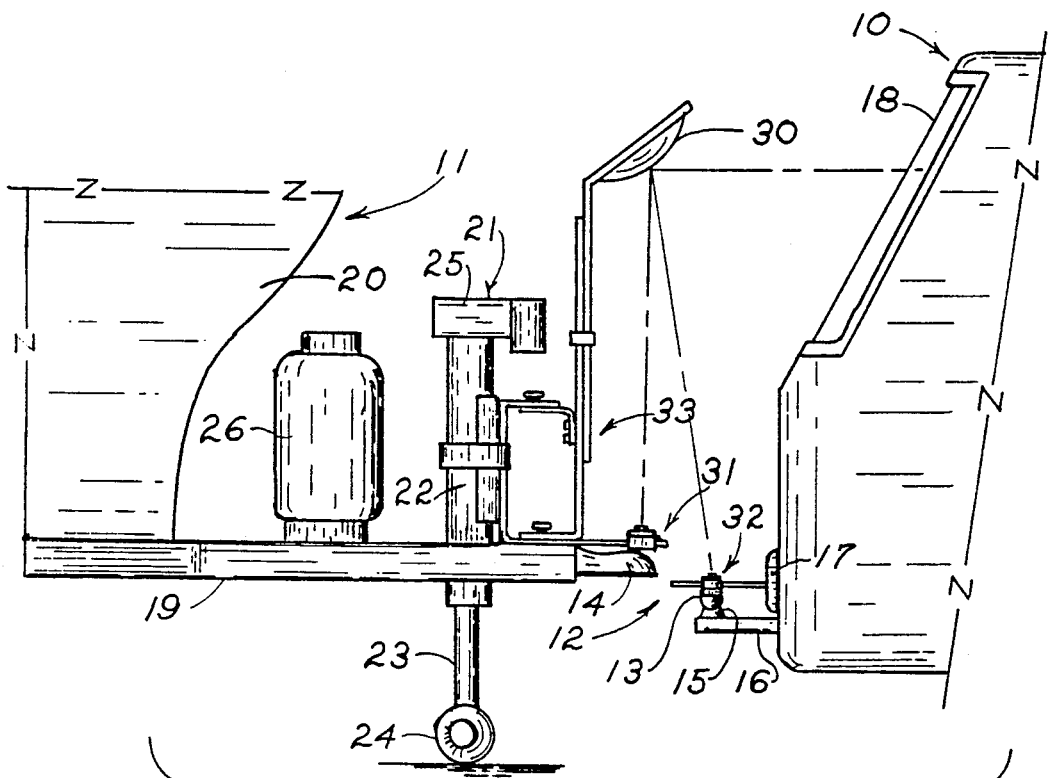
FIG. 1 is a side elevational view of fragmentary portions of a towing vehicle and a towed vehicle provided with an optical target system embodying this invention.

Referring to FIG. 1, a towing vehicle 10 is shown in a separated relationship to a towed vehicle or trailer 11. For convenience in reference in describing the invention, at times the towing vehicle may be referred to as an auto and a towed vehicle may be referred to as a trailer. A hitch assembly designated generally by the numeral 12 is provided for effecting mechanical interconnection of the auto and trailer into interconnected relationship. This hitch assembly includes a ball joint 13 carried by the auto 10 and a ball receiving socket 14 carried by the trailer 11. The ball joint 13 is a spherically shaped member carried on the upper end of an attaching shaft 15 that is mechanically secured to a supporting frame 16 that is attached to the auto and projects a distance rearwardly from the rear bumper 17. It will also be noted at this point that the auto 10 is provided with a single rearwardly facing window 18 that permits the operator of the auto to see objects that are disposed rearwardly of the auto.

Figure 5:
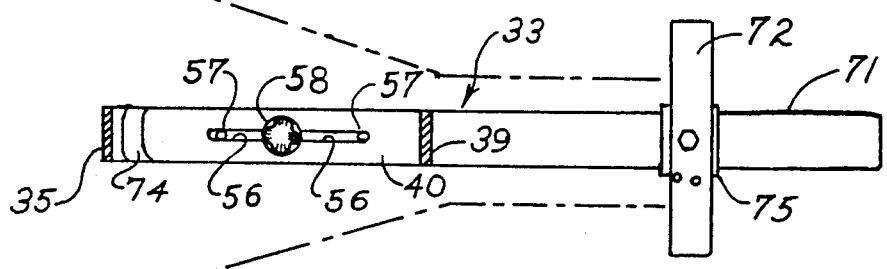
FIG. 5 is a sectional view taken along line 5—5 of FIG. 2.

The trailer 11 includes a base frame 19 on which may be supported a housing or other structure 20. This base frame is understood to be supported on an undercarriage including wheels to enable its being towed by the auto. The forward end portion of the base frame 19, as is typical with trailers of this nature, is triangularly shaped in plan view as is diagrammatically illustrated in FIG. 5. Positioned and secured at the extreme forward end of the frame 19 is the ball-receiving socket 14 of the hitch assembly. Trailers of this type are generally designed for carrying substantial weight and are invariably provided with a jackstand 21 to enable the vehicle operator to lift the front end of the trailer when detaching the trailer from the towing vehicle. This jackstand is located a distance rearwardly of the forward terminal end of the base frame 19 with its distance being longitudinally spaced with respect to the socket 14 in accordance with a particular manufacturer's specifications for a particular trailer. The diagrammatically illustrated jackstand 21 in FIG. 1 includes a structural housing 22 of cylindrical configuration that projects a distance upwardly from the top of the base frame 19 on which it is secured. The stand includes a screw jack mechanism having a lower end shaft 23 carrying a wheel 24 or other ground engaging component to provide support of the tongue at its lower end. This shaft 23 is vertically displaceable to effect raising or lowering of the tongue when disconnecting or in connecting the hitch assembly components. The illustrated jackstand 21 is of an electrically powered type having a gear motor drive 25 mounted on its upper end and mechanically coupled with the internal jack mechanism. It will be understood that some trailers are provided with jackstands that are of a manually operated screw jack construction, but it will be further noted that regardless of whether it is an electric or manual operation type, the jackstand does provide an obstacle to location of the one component of the optical target system of this invention. As will become apparent, this has been accommodated in the structure and functioning of the target system. To provide a complete picture, a trailer which is designed to be utilized as a mobile home is generally provided with one or more tanks containing a combustible fuel such as liquid propane. One such tank 26 is shown in FIG. 1 in its customary location which is rearward of the jackstand 21 and forward of the housing structure 20.

The optical target system of this invention includes three elements which are designated as a viewing mirror 30, a first target 31 associated with the ball-receiving socket 14 mounted on the trailer and a second target 32 that is associated with the ball joint 13 carried by the towing vehicle. Each of the first and second targets 31, 32 are adapted to be removably positioned on the respective vehicle in association with the respective component of the hitch assembly 12 with the viewing mirror 30 also adapted for temporary mounting on the trailer 11. The temporary mounting aspect is dictated by the fact that the optical target system only has function and use at the time of effecting coupling of the auto to the trailer and, at all other times, it is desired to simply store the system, either in the auto or in the trailer until such future time as it may again be desired for use in facilitating coupling of the two vehicles.

The illustrated embodiment of this invention includes a single support standard 33 which is provided to perform the dual functions of positioning the viewing mirror 30 at an appropriate elevation for the particular vehicles with which it is being used and support of the first target 31 in aligned relationship with respect to the socket 14 of the hitch assembly. This support standard 33 is of a construction such that it is adapted to be detachably secured to the structural housing 22 of the jackstand and has adjustability features to effect horizontal positioning of the first target 31 along a longitudinal axis as well as providing adjustment as to the location of the mirror along the same longitudinal axis of the trailer and its vertical positioning. Longitudinal alignment is readily accomplished through capability of the standard 33 to be rotatably displaced about the jackstand housing 22 to an appropriate position through the means utilized to effect attachment as will be readily understood from the following detailed description of that attachment means. Forming the base component of the support standard 33 is a C-shaped bracket 34 formed from a rigid metal strap and including a base bar 35, a relatively long bottom bar 36 and a short top bar 37. The terminology "bottom" and "top" is used as the support standard and particularly the bracket 34 when in use is designed to be placed in a substantially vertical plane which results in the bars 36 and 37 being disposed in superposed relationship. Secured to the bracket 34 is a mirror support bracket 38 having a relatively long vertical bar 39 and a bottom bar 40 which is adapted to be disposed in supported relationship on the bottom bar 36 of the C-shaped bracket. Secured to the vertical bar 39 is an L-shaped bracket 41 having one of its legs positioned to extend in closely adjacent and underlying relationship to the top bar 37 to which it is adapted to be secured. While the illustrated support standard 33 performs the dual functions of supporting and positioning of both the mirror 30 and first target 31 as being an advantageous arrangement, it will be noted that separate and independent structures may be devised for mounting of these components.

Figure 2:
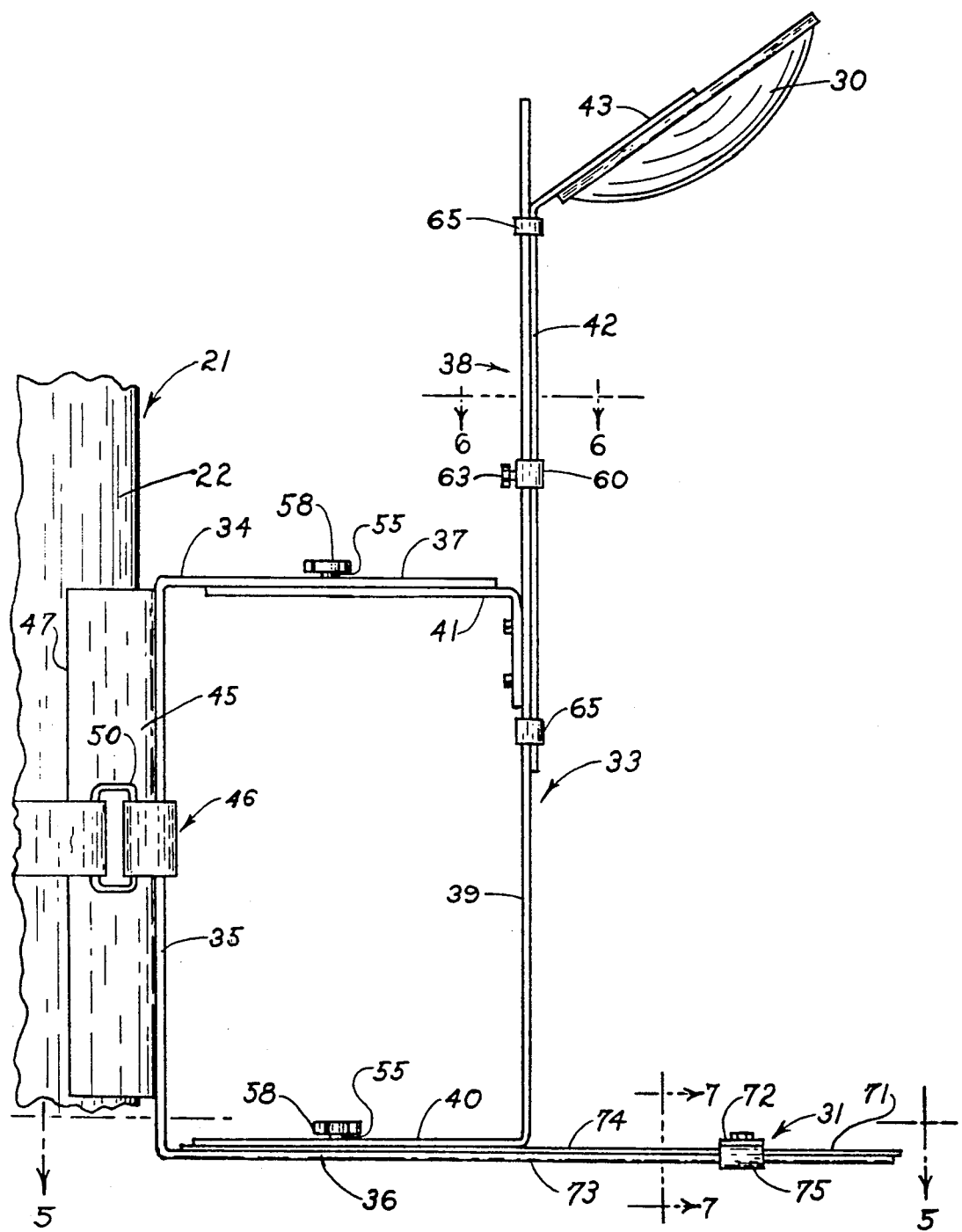
FIG. 2 is a side elevational view on a substantially enlarged scale of the viewing mirror and target mechanism positioned on the towed vehicle.

Adjustably secured to the vertical bar 39 is a mirror mounting bracket 42 including an elongated bar adapted to extend along and in parallel relationship to the vertical bar 39 and carrying at its upper end an outturned arm 43 to which the viewing mirror 30 is attached. The viewing mirror 30 comprises a convex shaped mirror segment which, in plan view, is rectangularly shaped with the longer of its axes extending parallel to the arm 43. The arm 43 is shown in FIG. 2 as being disposed at an angle of the order of 45 degrees with respect to the mirror support bracket although this angle may be reduced to about a 30 degree angle depending upon the particular optical characteristics and the viewing angle preferred for specific installations. The convex mirror provides "wide angle" imaging, thus enlarging the field of view for the operator. In a prototype that was constructed and tested, the mirror's radius of curvature was such that the operator could see images of both targets 31 and 32 when the two vehicles were over six feet apart.

As previously indicated, the support standard 33 is adapted to be detachably secured to the structural housing 22 of the jackstand. To accomplish this objective, an elongated channel 45 is attached to the base bar 35 of the bracket 34 with a securing strap 46 provided to clamp the structure to the jackstand housing 22. The channel 45 is formed from a relatively thin sheet metal and has a cross-sectional shape that approximates a flat bottom V having two longitudinal flanges 47 that are relatively divergent from the bottom of the V and of a lateral extent sufficient to extend partially around the cylindrical housing 22. To avoid damaging or marring of the finish on the jackstand housing, the inwardly facing surfaces of those flanges 47 are provided with a sheet-form protective covering 48. The single securing strap 46 is affixed to the vertical base bar 35 at its approximate midpoint. The strap includes a flexible section 49 which is secured adjacent its one end to the vertical base bar 35. It is of a length to extend circumferentially around the jackstand housing 22 with the end portion 51 thereof adapted to extend through a securing loop 50 that is attached to the opposite end of the strap adjacent its point of attachment to the bar 35. Portions of the strap flexible section 49 are provided on the outwardly facing side thereof with respective sections of a hook and loop-type fastening device. Securing of the strap around the jackstand housing is thus readily accomplished by simply training the strap around the housing, extending its terminal end 51 through the loop 50 and then positioning the end portion in a reverse manner over the portion 52 of the strap that is provided with the mating part of the hook and loop fastening device. This provides relatively secure positioning of the apparatus on the jackstand housing. It also enables not only the rotatable positioning to effect longitudinal alignment of the first target as previously noted, but enables adjustment in vertical positioning for reasons discussed in the following paragraph.

The C-shaped bracket 34 of the support standard 33 is dimensioned to be positionable on most of the standard jackstand assemblies. Accordingly, it has a vertical dimension that is of the order of ten inches which, with the lower portion supported and positioned on the upper surface of the trailer's base frame 19, places the upper portions at a sufficient distance below the topmost components of the jackstand such as either the illustrated motor drive 25 or a manual crank if the particular jackstand should be provided with the manual mechanism. Either of those mechanisms extend a distance laterally from the vertical axis of the jackstand and in the case of the manual crank, it is necessary to have clearance for rotation of the crank.

Although not illustrated, it is to be noted that, on the trailers of some manufacturers, the ball-receiving socket 14 may be mounted on the frame 19 in a manner so as to project a distance above the frame's upper surface. A structural arrangement of this nature can be accommodated by the illustrated support standard 33. The ten inch vertical height of the C-shaped bracket 34 is substantially less than the vertical dimension of the jackstand housing 22 underlying the motor drive 25, or the crank in the case of a manual jack, thus enabling the support standard to be moved upwardly from the position shown in FIG. 1 and clamped to the jackstand housing at a sufficiently elevated position such that the bottom bar 36 and associated components of the first target 31 will be on top of the ball-receiving socket 14. As previously noted, there are dimensional variations as between the trailers of different manufacturers as well as models in a particular manufacturer's line as between the location of the jackstand and the forward end of the trailer's base frame and, in particular, the location of the ball-receiving socket 14 of the hitch assembly. To enable a single unit of the invention to accommodate these dimensional variations, the support standard 33 is designed to enable it to be adjusted in a horizontal direction as referenced to its mounted position on the jackstand. This horizontal adjustment is designed to permit the mirror 30 to be advanced or retracted along a longitudinal axis and to be appropriately positioned vertically above a ball-receiving socket 14. Accordingly, in the illustrative embodiment, the mirror support bracket is secured to the C-shaped bracket 34 by a pair of clamp bolts 55. Each of the clamp bolts 55 includes a threaded shaft portion which extends through an elongated slot 56 formed in and extending longitudinally with respect to the top bar 37 of the C-shaped bracket 34 and the bottom bar 40 of the mirror support bracket 38. That threaded shaft is adapted to be threaded into one of several longitudinally spaced threaded sockets 57 formed in the respective underlying bottom bar 36 and the bracket 41. The upper end of each of the clamp bolts is provided with an enlarged knob 58 which facilitates gripping by a person's hand for either tightening or loosening the bolt. This mechanism enables the support standard 33 to be adjusted through a substantial range to place the mirror 30 in a desired position. In an exemplary embodiment of the invention, the mirror support bracket 38 is at a minimum horizontal spacing with respect to the base bar 35 of the order of five inches and the structure is designed to permit a horizontal extension of the order of a further five inches. This is deemed sufficient to accommodate most dimensional variations that would be encountered in the existing trailer structures that are now on the market.

Figure 6:
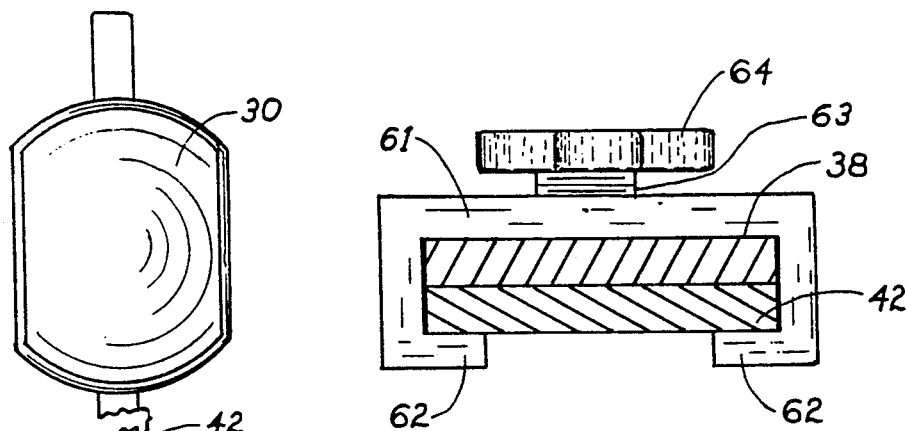
FIG. 6 is a sectional view on an enlarged scale taken along line 6—6 of FIG. 2.

Vertical adjustment of the viewing mirror 30 to a selected elevation is accomplished through operation of a clamp bracket 60 that mechanically couples the mirror support bracket bar 39 and mounting bracket 42. Structure of the clamp bracket 60, as well as its functioning, can be best understood by reference to FIGS. 2 and 6. The bracket comprises a rigid C-shaped unit adapted to partially encircle the two parallel disposed mirror support brackets 38 and mirror mounting bracket 42. This bracket includes a base plate 61 with respective flanges 62 disposed in spaced relationship thereto at a distance which is substantially equal to the combined thickness of the two bracket bars. A clamp bolt 63 is provided with its threaded shaft extending through a threaded aperture (not shown) formed in the base plate 61 with an end thereof projectable into contacting engagement with the bracket 38. An opposite exposed end of this bolt 63 is provided with a knob 64 to facilitate gripping by a person's hand for either tightening or loosening the clamp bracket. With the clamp bolt 63 loosened, the mirror mounting bracket 42 may be displaced either vertically upward or downward on the support bracket bar 39 to place the mirror at a desired elevation. When appropriately located, the clamp bolt 63 is then tightened to clamp the two brackets tightly together into frictional engagement.

In accordance with this invention, the support standard 33 is dimensionally configured to place the mirror 30 at an elevation above the bottom bar 36, or the upper surface of the trailer's base frame 19, at a minimum of about twelve inches. The lengths of the support bracket vertical bar 39 and the mirror mounting bracket 42 are of length to cooperatively enable positioning of the mirror 30 at an elevation in the range of 30–36 inches above the top of the trailer base frame. In view of this relatively large extent of adjustment, it is advantageous to provide one or more pairs of guide lugs 65 that are secured to the mirror support bracket bar 39 at vertically spaced locations to aid in preventing displacement of the mirror mounting bracket from longitudinal alignment with the support bracket 38.

Figure 3:
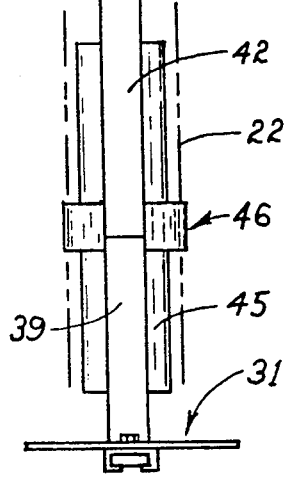
FIG. 3 is a front elevational view of the mirror and target mechanism shown in FIG. 2.

In addition to providing a support for the viewing mirror 30, the support standard 33 provides a mounting base and component of the first target 31. As can be best seen in FIGS. 2, 3 and 5, the first target includes a longitudinal guidance element 71 and a transverse guidance element 72. Each of these elements comprises an elongated flat strip disposed to have the plane of the strip lie in a relatively horizontal plane, and thus, provide a substantial surface area to facilitate viewing through the means of this optical target system. The longitudinal guidance element is formed as a forwardly extending portion of the bottom bar 36 of the C-shaped bracket 34. This extension 73 is of a length such that its outer terminal end will project a distance longitudinally forward and extend over the ball-receiving socket 14. The total length of the bar 36 and its forward extension 73 are of a combined length such that the apparatus will be capable of accommodating substantially the entire range of dimensional variations found between trailers of different manufacture and model as to the distance between the jackstand 21 and the ball-receiving socket of any particular manufacturer and model. To enhance visibility and visual distinctiveness, a strip of material 74 is disposed in overlying relationship to the upper surface of the bar 36 and its extension 73. This strip of material 74 is relatively thin in thickness dimension and is advantageously formed from a material such as a suitable plastic that is of a relatively brilliant white color to enhance its visibility characteristics. It is advantageously of a length as can be best seen in FIG. 2 to extend essentially the entire length of the bar 36 and its extension with the other components of the support standard such as the bottom bar of the mirror's support bracket 38 resting on the strip and with the strip formed with an elongated slot to coincide with the slot 56 formed in that bottom bar. Extending the cover strip 74 the entire length thus avoids having any interference in the movement and adjustment of the mirror.

Figure 7:
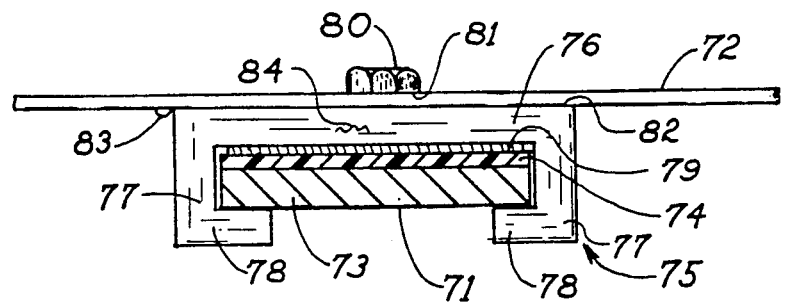
FIG. 7 is a fragmentary sectional view on an enlarged scale taken along line 7—7 of FIG. 2.

Attachment and mechanical mounting of the transverse guidance element 72 with respect to the longitudinal element 71 is advantageously effected by a mechanism that enables the transverse element to be relatively positioned longitudinally as well as permitting pivoting of the transverse element to a stored position. This is effected in the illustrative embodiment by a slideable connector 75 which can be best seen in FIG. 7. This connector is of a relatively rigid construction and it may be formed by molding from a suitable plastic material having an end view configuration of a generally C shape for receiving the longitudinal element 71. As such, it includes a base plate 76 adapted to overlie the top of the longitudinal guidance element with the transverse element 72 secured thereto. The base plate 76 is of a dimension to extend transversely across the longitudinal guidance element 71 and is formed at each of its opposite ends with downwardly extending legs 77 that are each provided at their lower ends with an inturned flange 78. Each of the legs 77 is of a length that is substantially equal to the combined thicknesses of the extension bar 73 and its overlying strip of material 74 whereby the connector is enabled to grip the longitudinal guidance elements and be positioned in a desired position during the time that it is being utilized to hold the transverse guidance element 72 at an appropriate position to facilitate the alignment of the hitch assembly components. Frictional interengagement of the connector and longitudinal elements is enhanced through provision of a sheet of friction material 79 that is affixed to the inner face of the base plate 76 and thus disposed in contacting engagement with the upper surface of the strip 74 provided on the top of the longitudinal element. This sheet of friction material 79 not only enhances the frictional interengagement to better assure that the transverse element will be maintained in the desired position, but by fabricating it from a suitable material having a lesser hardness characteristic than the strip 74, the upper surface of that strip will be protected from being scratched or otherwise marred which would tend to diminish its visual distinctiveness. Attachment of the transverse element 72 to the connector 75 is advantageously effected by a threaded bolt 80 which has its shaft extended through an aperture in the transverse element 72 and is threaded into the base plate 76. By appropriate dimensioning of the bolt shank with respect to the threaded socket formed in the base plate, the bolt can be frictionally secured and will not be inadvertently loosened during the course of operation of the mechanism. In this illustrative embodiment, the bolt is threaded into its socket to place the lower face 81 of the bolt head at a distance spaced from the upper surface 82 of the connector's base plate at a distance which is substantially equal to the thickness of the transverse element. This spacing may be of the order such that there will be frictional interengagement between the adjacent contacting surfaces of the connector base plate and the transverse element to assist in maintaining the element in a desired position with respect to the connector. To better assure that the transverse element 72 will be maintained in proper alignment as well as to facilitate its positioning, a pair of downwardly extending projections 83 are integrally formed in the transverse element 72 at a distance from the pivot point defined by the bolt 80 so as to be aligned and interengage with the outer vertical face of a downwardly extending leg 77. The longitudinal length of the connector's base plate is also equally dimensioned with respect to the pivot axis of the bolt 80 whereby the projections 83 will engage an end face 84 of the connector when the transverse element is pivoted to a position to be aligned with the longitudinal guidance element 71. Thus, the projections 83 function as detents to assure that the transverse element will be maintained in either a transverse position for operation or maintain that element in a longitudinally aligned relationship to the longitudinal element to minimize the space requirements for purposes of storage.

Figure 8:
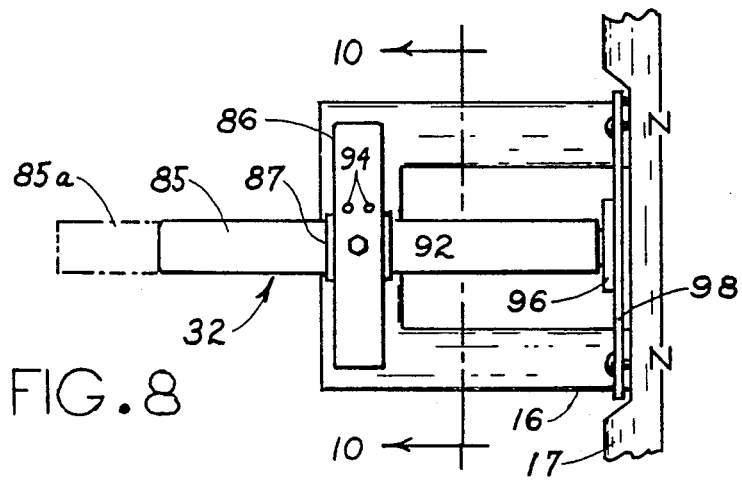
FIG. 8 is a top plan view on an enlarged scale of the target mechanism positioned on the ball component of the hitch assembly secured to the towing vehicle.
Figure 9:
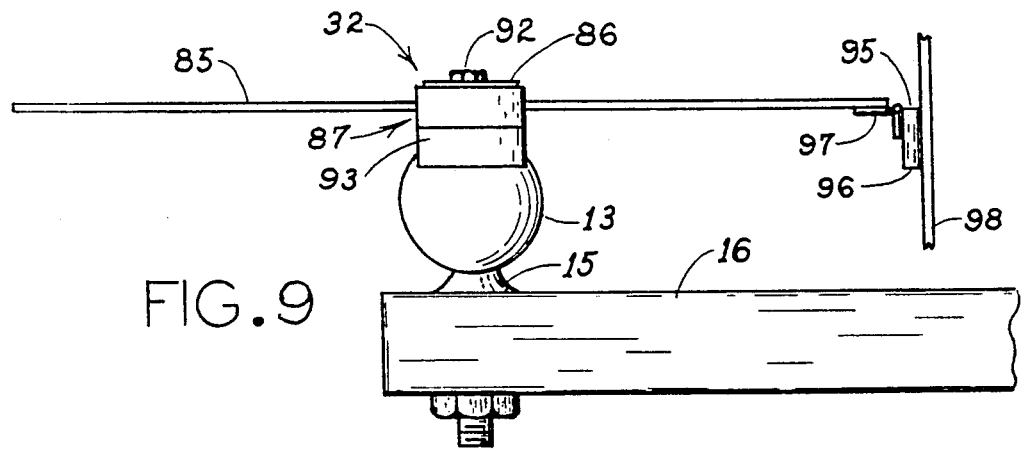
FIG. 9 is a side elevational view of the target mechanism shown in FIG. 8.
Figure 10:
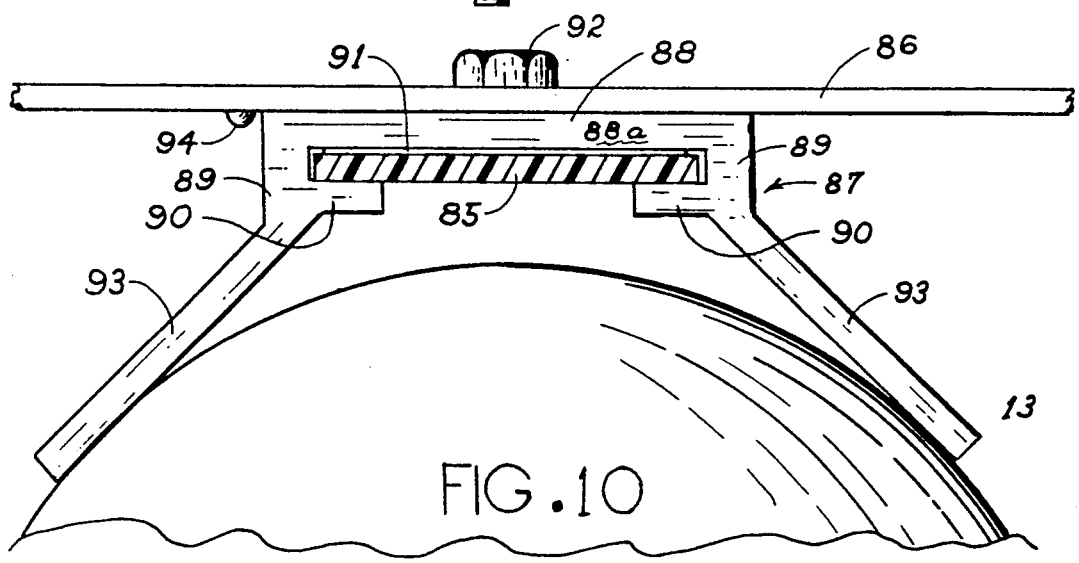
FIG. 10 is a fragmentary sectional view on an enlarged scale taken along line 10—10 of FIG. 8.

Structural details of the second target 32 are shown most clearly in FIGS. 8, 9 and 10. It is similar in its basic construction to the first target 31 described in the preceding paragraph in that it also includes a longitudinal guidance element 85 and a transverse guidance element 86. These two elements which are each formed from flat strips of material such as plastic and are also advantageously of a highly visible color such as white to enhance their visibility to the vehicle operator. These elements are designed to be positioned in orthogonal relationship in the same manner as the elements of the first target to provide longitudinal guidance reference as well as a transverse reference for determining when the first and second targets are in alignment. A connector 87 is provided to secure the two elements 85 and 86 and is similar in construction to that described in association with the first target. As such, the connector 87 includes a base plate 88 and is provided with downwardly extending legs 89 at each end with inturned flanges 90 formed at their lower ends to define a generally rectangular aperture for receiving the longitudinal guidance element 85 in relatively slideable relationship. A sheet 91 of a material exhibiting frictional characteristics is advantageously secured to the inner face of the base plate 88 to enhance the frictional interengagement between the connector and the element 85 and better assure that it will be maintained in a desired position to which it may be placed. A pivot mechanism comprising a threaded bolt 92 is provided for mechanically securing the transverse guidance element 86 to the top of the connector 87. This bolt is designed to be frictionally engaged in a threaded socket formed in the base plate to better assure that it will not be inadvertently loosened and removed. The bolt extends through the transverse guidance element 86 which is thus pivotal about the upper surface of the connector and can thus be placed in either the operative transverse relationship as is shown in FIG. 8 or it may be placed in longitudinally aligned relationship with respect to the longitudinal element for purposes of storage and minimizing of space requirements. A pair of downwardly extending detent projections 94 are integrally formed in the transverse element 86 at a position where they will be disposed adjacent the outer surface of one of the downwardly extending legs 89 of the connector as is shown in FIG. 10 to assist in assuring that the elements will be orthogonally related to each other and to also assist in maintaining the elements in that relationship. The connector 87 is of an axial length in one direction with respect to the pivot point such that the base plate 88 has an end face 88a disposed equidistantly from the pivot point as is the outer surface of the downwardly extending leg 89. With this dimensioning, the projections 94 are also able to cooperate with that surface and assist in maintaining the transverse element in longitudinal alignment with the longitudinal element for purposes of minimizing storage space requirements.

This connector 87 differs from that described with respect to the first target 31 in that it is also formed with a pair of downwardly directed divergent legs 93. These legs are dimensioned and angularly oriented to each other to receive the upper portion of the ball joint 13 upon which the connector rests in vertically supported relationship and assist in maintaining the second target in an appropriate position with respect to that ball joint. This functioning will be further described in conjunction with positioning of the second target in association with the towing vehicle. However, it will be noted that the angle of divergence of the legs 93 and their length are designed to accommodate the different diameter ball joints that may be encountered, namely the three common sizes currently in existence (1⅞", 2" and 2 5/16" Dia.).

Securing and fixing of the second target in association with the towing vehicle is effected by a magnetic attaching mechanism 95. This attaching mechanism includes a bar magnet 96 which is secured by a hinge 97 to a terminal end of the longitudinal guidance element 85. The function of the magnet is to provide a means of releasably securing the second target to the vehicle through magnetic attraction to a metallic portion thereof such as either a license plate or, in some cases, directly to the bumper or other components of the vehicle. In the illustrative embodiment, the target is shown as being secured to a license plate 98 that is carried on a rearwardly facing surface of the vehicle bumper 17. Providing a hinged interconnection enhances the versatility of the target and its placement on vehicles where perhaps the license plate is not readily available or the bumper may not include metallic elements at that particular point of location. The longitudinal guidance element 85 is of a sufficient length to accommodate the variations that may be encountered in the supporting frame structure 16 on which the ball joint 13 may be carried as between different vehicles and to provide not only the attachment to the vehicle by means of the magnet, but also permitting positioning of the connector 87 directly above and on the ball joint 13. In placement of the second target 32 on the vehicle, the unit is first positioned to have the transverse guidance element 86 placed in a orthogonal relationship and then disposing the magnet in engagement with a component of the vehicle. When thus positioned, the connector 87 may be slid longitudinally along the element 85 to place it directly over the ball joint 13 with the divergent legs 93 engaging with the ball joint 13 to thereby resist lateral displacement.

It is desirable that the longitudinal guidance element 85 of the second target 32 be as long as possible as that enhances its ability to provide guidance. However, there is a practical limit imposed on its length due to possible interference between the element 85 and underneath components of the ball-receiving socket 14 or the forward end of the trailer frame 19. When disconnecting the hitch assembly components, the tongue is usually elevated only to the extent necessary to obtain sufficient vertical clearance between the ball joint 13 and the socket 14 to permit relative movement. Since there are differences in trailer structures, the longitudinal guidance element 85 may not project as great a distance rearwardly from the ball joint in some cases as it may in others. In accordance with this invention, it is contemplated that the element 85 will be made with a maximum length deemed possible and the user directed to cut the element to maximum length acceptable for a specific hitch assembly as by having an end portion indicated by broken line 85a in FIG. 8 cut off.

Functioning of the optical target system from the viewpoint of the vehicle operator in assisting in alignment of the components of the hitch assembly is diagrammatically illustrated in a sequential set of FIGS., Nos. 11-14. These figures diagrammatically illustrate the operator's view of the front face of the viewing mirror 30 and in which images of the first and second targets 31 and 32 are visible. The first target 31 which is associated with the trailer remains in a substantially fixed position as seen in the mirror by the vehicle operator. Since the mirror is fixed on the trailer and oriented with respect to that target, it is shown in a centered position and is located in the bottom portion of the mirror. With the towing vehicle being relatively positioned with respect to the trailer so as to place the rear thereof in somewhat close proximity to the front of the trailer, it is initially assumed that the operator can also see the second target 32 which is carried on the vehicle that he is maneuvering into position for connection of the hitch assembly components. With a convex mirror, the relative spacing of the vehicles and their respective targets permits the second targets to be seen even though the vehicles may be separated by a substantial distance such as the order of six to eight feet. The convex mirror functions to bring the components into closer proximity from an appearance standpoint than they are in actuality.

Referring to FIG. 11, it is assumed that the vehicle operator has maneuvered the towing vehicle into an approximate position and alignment with the trailer, although as indicated by the respective images, the towing vehicle is laterally offset with respect to the longitudinal axis of the trailer and its hitch assembly. FIG. 12 illustrates the operator having maneuvered the towing vehicle in a relatively angular position to bring its longitudinal axis toward alignment with the longitudinal axis of the trailer and the first target. This angular relationship and continued movement of the towing vehicle into approaching relationship to the trailer will, if correctly handled, result in bringing the two vehicles into longitudinal alignment, although still separated, as is diagrammatically illustrated in FIG. 13. When the operator has obtained this longitudinal alignment, the towing vehicle can then be further backed toward the trailer and ultimately bring the two targets into alignment as is shown in FIG. 14. The two targets can thus be seen as providing a convenient and highly useful means of enabling the operator to bring the hitch components, namely the ball joint 13 and the ball receiving socket 14, into superposed alignment to enable them to be engaged. This aligned position is indicated with the respective longitudinal guidance elements 71 and 85 of the two targets being axially aligned with the respective transverse guidance elements 72 and 86 also brought into transverse alignment. With the transverse guidance element 86 of the second target as carried on the towing vehicle being relatively longer than the transverse element of the first target, the vehicle operator can readily determine when the two transverse elements are aligned and indicating that the hitch assembly components are also in superposed relationship.

Figure 4:
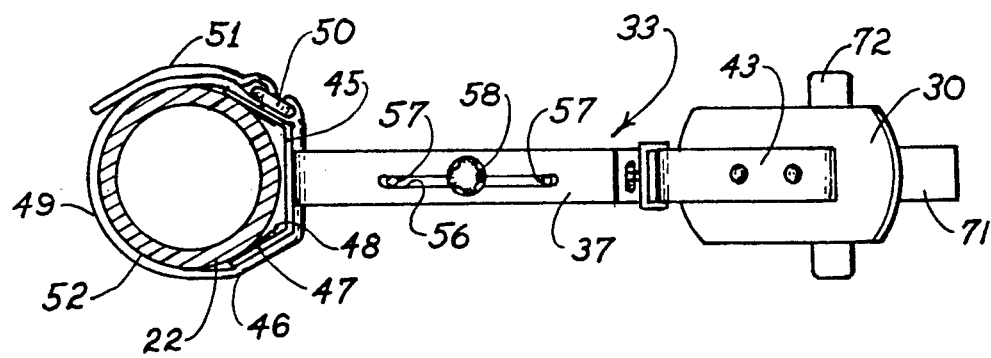
FIG. 4 is a top plan view of the viewing mirror and target mechanism associated with the towed vehicle shown in FIG. 2.
Figure 15:
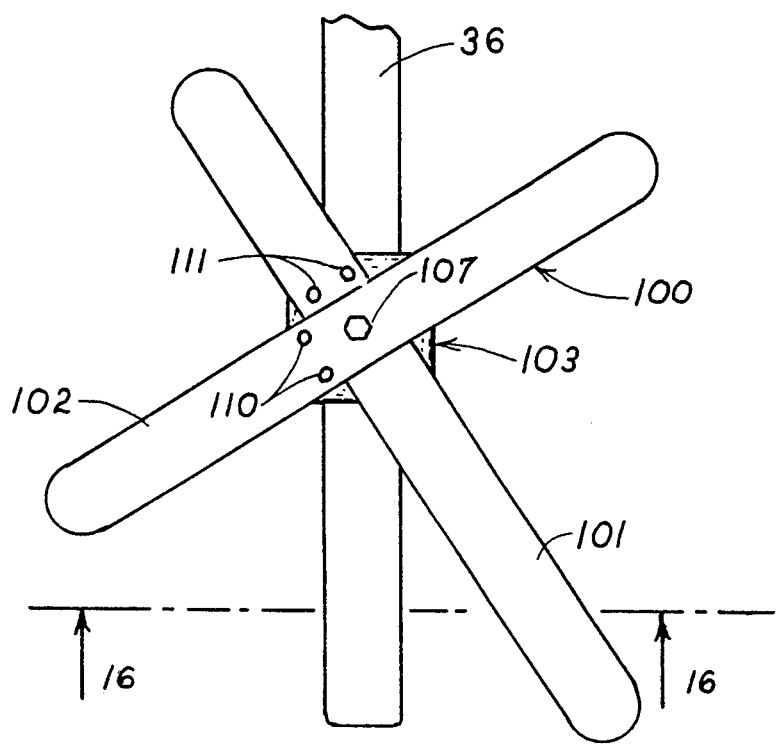
FIG. 15 is a top plan view of a modified target associated with the trailer hitch assembly components.
Figure 16:
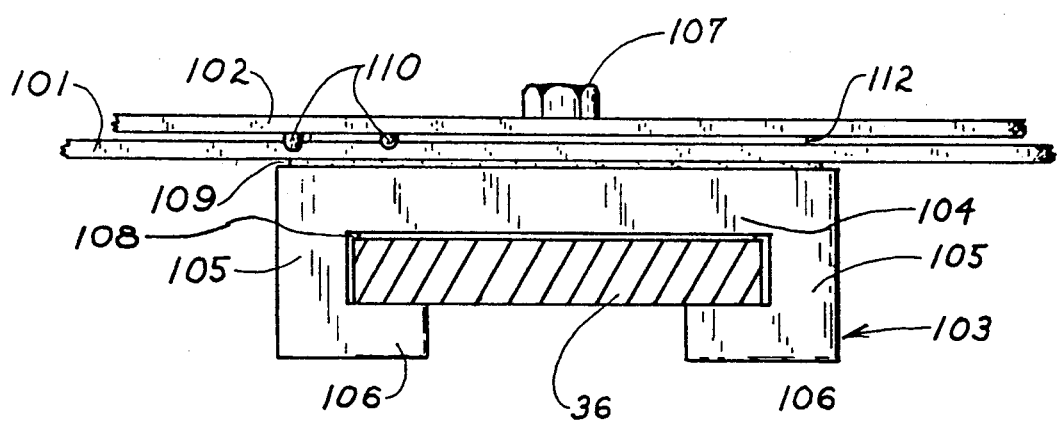
FIG. 16 is a fragmentary sectional view thereof on an enlarged scale taken along line 16—16 of FIG. 15.

While the most common situation with respect to orientation of the towing vehicle 10 and towed vehicle 11 is substantially longitudinally aligned, this is not necessarily so and sometimes it is necessary that the towing vehicle be backed toward the trailer at a slight angle to the longitudinal axis of the trailer. To better enable the optical target system of this invention to accommodate such a situation and to aid the vehicle operator in guiding the towing vehicle into proper position for alignment of the hitch assembly components, a modified first target 100 may be provided as is shown in FIGS. 15 and 16. This modified first target also includes longitudinal and transverse guidance elements 101 and 102 which are adapted to be mounted and supported on a forwardly extending component of the bottom bar 36 of the support standard 33 having a construction as previously described in conjunction with FIGS. 2, 3 and 4. In this modified structure, both of the guidance elements 101 and 102 are mechanically interconnected by a connector bracket 103 which is also designed to provide mechanical interconnection of those elements with the bottom bar 36 and its extension 73. This connector bracket 103 is of C-shaped configuration as seen in end elevation as shown in FIG. 16 having a base plate 104 and opposite downwardly extending legs 105 terminating in inturned flanges 106. The legs and flanges in cooperation with the base plate define a rectangularly shaped aperture which is of a dimension to receive the elongated bottom bar 36. The two guidance elements 101 and 102 are positioned on the top surface of the connector bracket and are pivotally secured thereto by a pivot mechanism 107. This pivot mechanism is shown as comprising a threaded bolt which extends through apertures in the respective guidance elements and threads into a socket formed in the base plate 104 of the connector bracket. Again, the dimensioning of the threaded bolt and its socket are such as to provide an interference fit to mechanically secure the bolt in a fixed position and prevent its inadvertent removal or loosening of the components. A sheet 108 of friction material may be secured to the inner surface of the connector bracket's base plate 104 to enhance the frictional engagement with the bar 36 and better assure that the connector bracket will be retained in a desired location to which it is positioned on the bar. A sheet 109 also of a friction material is advantageously placed on the top surface of the bracket to enhance the ability of the components to be retained in a selected position. This sheet of friction material may be affixed to the upper surface of the bracket or it may be secured to the bottom surface of the longitudinal guidance element 101. A pair of downwardly extending detent projections 110 are formed in one of the guidance elements such as the transverse element 102 at a position where they will engage with a longitudinal edge surface of the underlying guidance element 101 to facilitate their orthogonal relationship and orientation in a position for operation. A pair of detent sockets 111 are integrally formed in the longitudinal element 101 at a location with respect to the pivot axis and relatively spaced apart a distance such that they will receive the projections 110 when the two elements are longitudinally aligned for purposes of conservation of storage space. The sockets 111 also result in formation of downwardly extending projections. They do not function as projections for any purpose, but are formed in this manner to provide sockets that will receive the projections 110 as they may be conveniently formed by forming of indentations in the guidance element. A spacer disk 112 may be provided and positioned between the two guidance elements at the point of interconnection with the pivot mechanism 107. This spacer is of a dimension in thickness to maintain a slight separation between the adjacent or opposed surfaces of the two guidance elements to prevent their contact and avoid marking or marring of the surfaces to maintain their visibility characteristics. Where such a spacer 112 is provided, the detent projections 110 are correspondingly extended in length to enable them to operate with respect to the longitudinal element as well as to interfit into the sockets 111.

Functioning of the modified first target 100 as shown in FIGS. 15 and 16 is essentially the same as that described with the basic embodiment heretofore illustrated and described. The apparatus is initially set up on the trailer with the support standard 33 secured to the jackstand 21. When thus positioned, the connector bracket 103 is slid along the bottom bar 36 to a position where its pivot axis will be vertically aligned with the axis of the ball-receiving socket 14. When thus positioned, the longitudinal and transverse guidance elements 101 and 102 are angularly disposed with respect to each other in orthogonal relationship and the longitudinal element 101 is then disposed in angular relationship to the bar 36 as well as the longitudinal axis of the trailer to extend along a line that approximates the axis or path of travel which must be taken by the towing vehicle to effect proper positioning of the hitch assembly components. When thus positioned as is diagrammatically illustrated in FIG. 15, the vehicle operator than maneuvers the towing vehicle in the same manner as described in conjunction with the diagrammatic illustrations of FIGS. 11-14 so as to effect longitudinal alignment of the respective longitudinal guidance elements of the first and second targets and the alignment of the transverse guidance elements.

Figure 17:
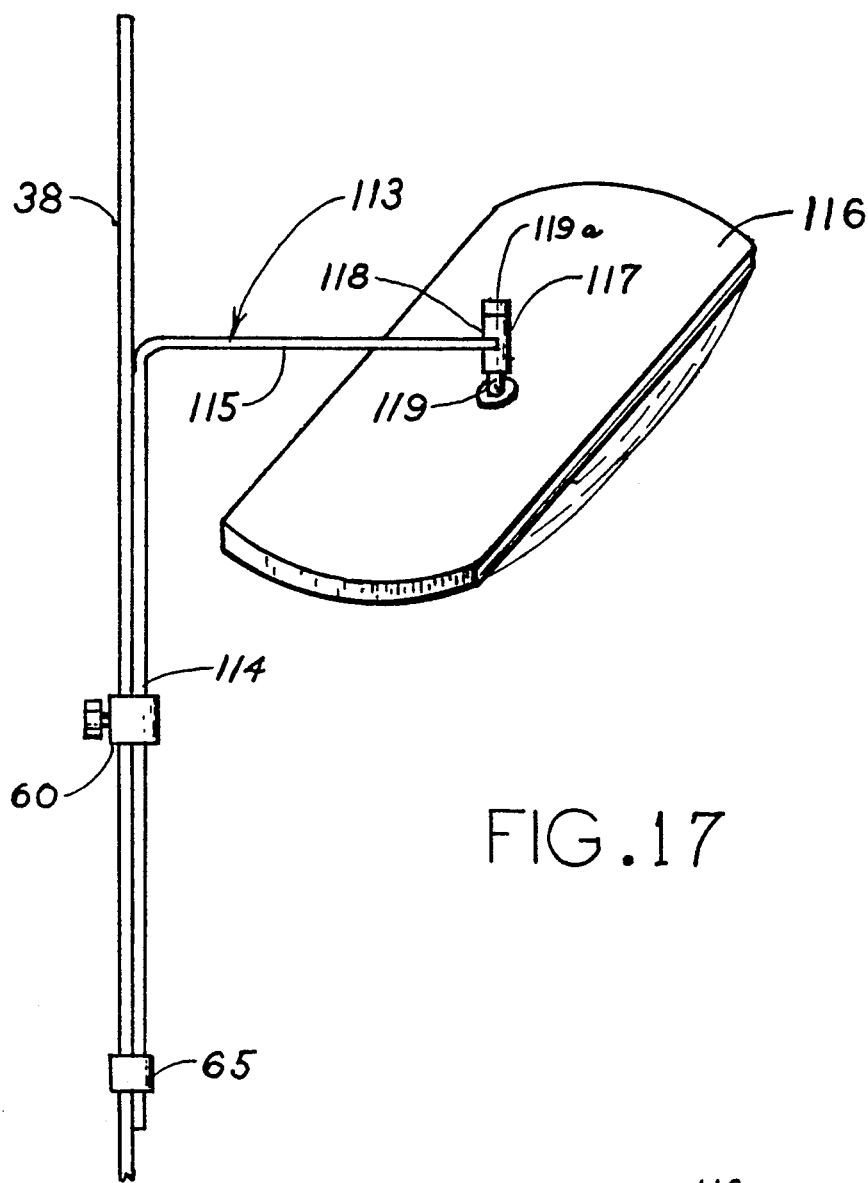
FIG. 17 is a side elevational view of a modified mirror mounting bracket.
Figure 18:
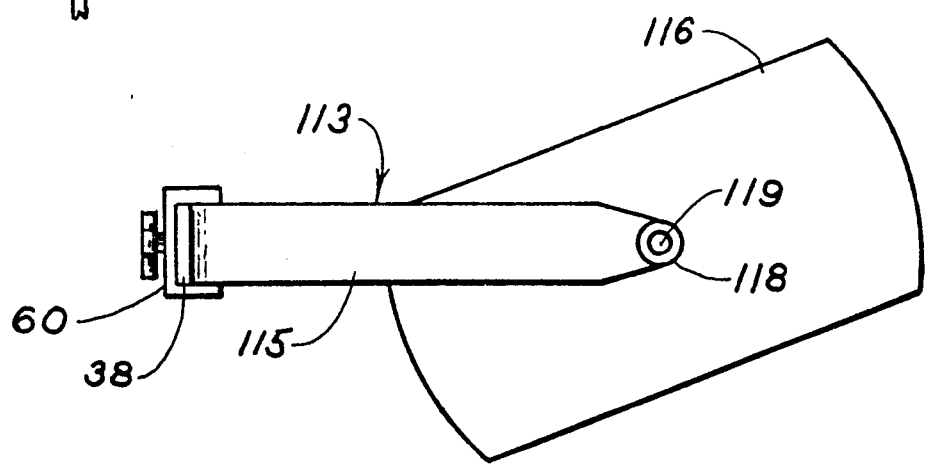
FIG. 18 is a top plan view of the mirror mounting bracket shown in FIG. 17.

Enhancement of the vehicle operator's view of the respective first and second targets where a modified first target 100 such as that shown in FIGS. 15 and 16 is provided is obtained through provision of a modified mirror mounting bracket 113 as is shown in FIGS. 17 and 18. This modified mirror mounting bracket enables angular positioning of the mirror 30 so that its longitudinal axis will also be aligned with the longitudinal guidance element 101. Accordingly, this mounting bracket includes a vertical bar 114 that is adapted to be secured to the upstanding mirror support bracket 38 such as by means of the clamp bracket 60. Formed integrally with the vertical bar 114 is a horizontally extending arm 115 which projects a distance laterally outwardly therefrom to a suitable distance for support of the viewing mirror 30. Mechanical attachment of the viewing mirror 30 in this modified structure is effected by a pivot mechanism 117 which includes a socket 118 secured to the horizontal arm 115 and a shaft 119 that is secured to the back face 116 of the mirror. A securing cap 119a is affixed to an upper end of the shaft 119 to maintain the shaft in the socket and support the weight of the mirror. It is advantageous that the shaft and socket be formed with an interference fit to better assure that the mirror will be maintained in the position that it may be placed. The location of the attachment of the shaft 119 is adjacent what is termed as the lower end of the mirror and is designed to substantially coincide with the general positioning of the image of the first target which with this modified structure is the modified target 100 as shown in FIGS. 15 and 16. This structural arrangement enables the mirror 30 to be pivoted about a vertical axis and to have its longitudinal axis to also be aligned with the longitudinal guidance element 101. This better assures that the vehicle operator will see the images of both the modified first target 100 and that of the second target 32 in essentially the same longitudinal alignment as is shown and described with the diagrammatic illustrations of FIGS. 11-14.

A modified second target 120 is illustrated in FIGS. 19 and 20 and is of a design that does not rely upon magnetic attachment to the license plate to obtain the necessary stability. This modified second target includes respective longitudinal and transverse guidance elements 121 and 122 that are of the same general structure and design as described with respect to the prior embodiment and function in essentially the same manner. The difference in this modified second target with respect to that previously described is the mechanism for effecting positioning and securing of the target in association with the ball joint 13. This target includes the longitudinal and transverse guidance elements 121 and 122 which are secured to a socket connector 123 designed to interfit with the ball joint 13 and to be supported on the supporting frame 16 of the vehicle's hitch supporting structure. The socket connector 123 comprises an elongated cylindrical tube that is of a diameter to receive the ball joint 13 and is open at the bottom end, but is closed at its upper end by a top wall 125. This tube 124 is of a length such that the top wall 125 will extend across the upper part of the ball joint 13 in inwardly spaced relationship thereto when the lower peripheral end 126 of the tube is disposed in contacting engagement with the upper surface of the supporting frame 16. Both the cylindrical tube 124 and the top wall 125 are of a relatively rigid construction such as being formed from either a thin metal or by a suitable plastic by an appropriate stamping or molding operation to provide the necessary vertical support for the guidance elements 121 and 122.

The two guidance elements are secured to the top wall 125 by a pivot mechanism 127 which is shown as including a threaded bolt 128 extending upwardly through aligned apertures formed in the respective components and having a locknut 129 threaded onto its upper end. The vertical extent or longitudinal length of the tube 124 is such that the bottom head of the bolt 128 will not be in engagement with the upper surface of the ball joint 13 and thus enable the lower peripheral bottom end 126 of the tube to rest on the upper surface of the frame element 16. The longitudinal guidance element 121 may be secured to the upper surface of the connector's top wall 125, although this is not an essential requirement. A sheet of frictional material 130 is interposed between the opposed surfaces of the two guidance elements 121 and 122 to avoid having movement of the one element with respect to the other to result in marring or destroying the surface finish and to thereby maintain the visibility of the upper surface of the bottom or underlying guidance element 121. A pair of detent projections 131 are integrally formed in the transverse guidance element 122 and extend downwardly therefrom at a location with respect to the pivot axis so that they will engage a longitudinal sidewall of the guidance element 121 when the two components are disposed in orthogonal relationship. These projections thus facilitate the proper geometric relationship of the two elements when they are disposed in an operative relationship to form the second target. A pair of downwardly extending sockets 132 are integrally formed in the longitudinal guidance element 121 with those sockets opening toward the upper surface. These sockets are disposed in radial relationship to the axis of the pivot mechanism 127 and are relatively spaced to receive the detent projections 131 when the two guidance elements are longitudinally aligned. This will assure that the two elements will be maintained in the aligned position to provide a minimal storage configuration of the structure.

The functioning and operation of this modified second target 120 is essentially similar to that previously described, the difference being that to position or mount the socket connector 123, it is only necessary to place its cylindrical tube 124 over the ball joint 13 with the bottom peripheral end 126 resting on the support frame 16. Through appropriate dimensioning of the diameter of the tube 124, the structure will be maintained in an upright position and result in carrying of the guidance elements 121 and 122 in a horizontal plane during the course of maneuvering of the towing vehicle. Since these ball joints 13 are of standardized diametrical dimension, the tube 124 may be dimensioned in diameter so as to maintain the structure of this upright position.

FIG. 21 illustrates a modification of the socket connector 123 as shown in FIGS. 20 and 19. In this modified structure, the socket connector 135 is formed with an elongated cylindrical tube 136 having an integrally formed, top endwall 137. The cylindrical tube 136 is formed from a material which is resiliently flexible and is mechanically secured to the guidance elements 121 and 122 by a pair of clamping plates 138 and 139 that are disposed at opposite sides of the endwall 137. The threaded bolt 128 and its associated locknut 129 are thus utilized in securing the tube into association with the guidance elements. In this structure, the tube 136 is formed with a diameter that is slightly less than a nominal diameter of the ball joint 13, and thus, when the tube is forced downwardly over the top of that ball joint, it will be distorted to a certain extent as is illustrated and effect a frictional interengagement with the ball joint. This results in the connector being effective in maintaining the second target in proper association with the ball joint for its utilization in assisting in alignment of the components of the hitch assembly.

It was previously noted that the ball joints commonly provided for hitch assemblies of this type, while being of standardized diametrical dimensions, are of three different diameters (1 ⅞", 2" and 2 5/16"). It is obvious that the two modifications shown in FIGS. 19, 20 and 21 are not designed to universally accommodate different sizes of the ball joints and it is necessary to provide the devices with cylindrical tubes of appropriate diameter. This is not the case with the first described embodiment of the second target as it is adaptive to the various diameters. Another disadvantage of the FIGS. 19-20 and 21 embodiments is cosmetic in nature if one is of the view that cosmetics are important. These hitch assemblies are usually lubricated with a viscous grease which will adhere to surfaces of the ball joint contacting components. The divergent legs 93 of the connector 87 of the FIGS. 8, 9 and 10 embodiment may well retain grease, but they may be more easily cleaned than can the interior of the cylindrical tubes of the FIGS. 19-20 embodiments. If grease is an objectionable problem, either a protective paper towel or sheet of plastic may be placed over the ball joint, or the residual grease can be wiped off.

Figure 22:
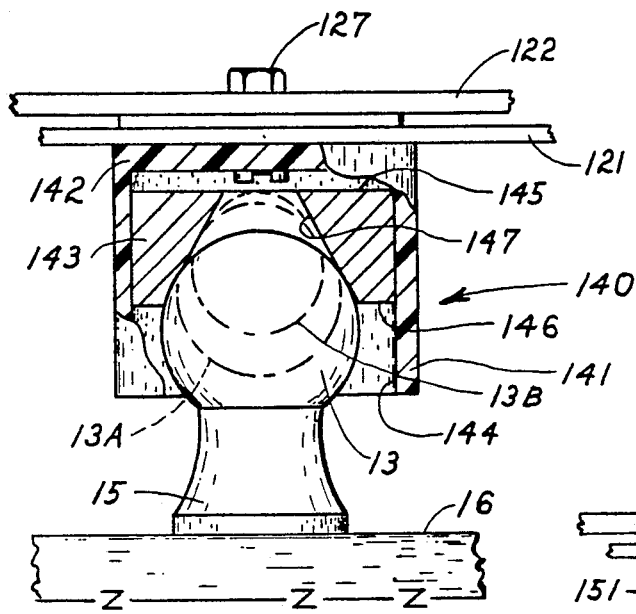
FIG. 22 is a fragmentary elevational view of another modified second target of a type similar to FIG. 20 with portions thereof broken away for clarity of illustration.

There are some structural modifications that can be employed to provide a structure of the type shown in FIGS. 19, 20 and 21, but which will be universally adaptive to the several different sized ball joint diameters. FIG. 22 is illustrative of one such further modified structure that can readily accommodate the three basic ball diameters. It comprises a socket connector 140 formed of an elongated cylindrical tube 141 closed at its upper end by an integrally formed end wall 142 with the guidance components as described with respect to the FIGS. 19 and 20 embodiment similarly provided and secured to the upper end wall. In this embodiment, the tube 141 is of a diameter sufficiently large to readily accommodate the largest diameter ball joint of the standardized sizes. Secured to the upper end wall 142 by the pivot mechanism 127 in the manner described with respect to the FIG. 20 embodiment are the longitudinal and transverse guidance elements 121 and 122. Disposed within the tube 141 is a magnet 143 of annular ring configuration and positioned in a radial plane with respect to the tube with its outer circumference in contacting engagement with an interior wall surface 144 of the tube. The magnet is maintained in fixed relationship thereto through either, or both, a mechanical interference fit or adhesive bonding. It is of a predetermined thickness having spaced end wall surfaces 145 and 146 with the upper surface spaced a distance downwardly from the interior face of the tube's end wall 142. A central, circular aperture 147 in the magnet is formed with a wall surface that is convergent toward the upper end wall surface 145, thereby defining a frusto-conical socket which is of a dimension to partially receive the top spherical portion of the ball joint 13. Thus, when positioned on top of the ball 13, the magnet 143 rests on the ball with the conical surface of its aperture 147 in tangential engagement with the ball in supporting the connector and its guidance elements, and is retained in position through magnetic force. Through appropriate tapering of aperture 147, the smaller diameter ball joints will be similarly accommodated as is shown by the broken line representations 13A and 13B and it can be seen how this structure is universally adaptive to the common ball joint dimensions.

Figure 23:
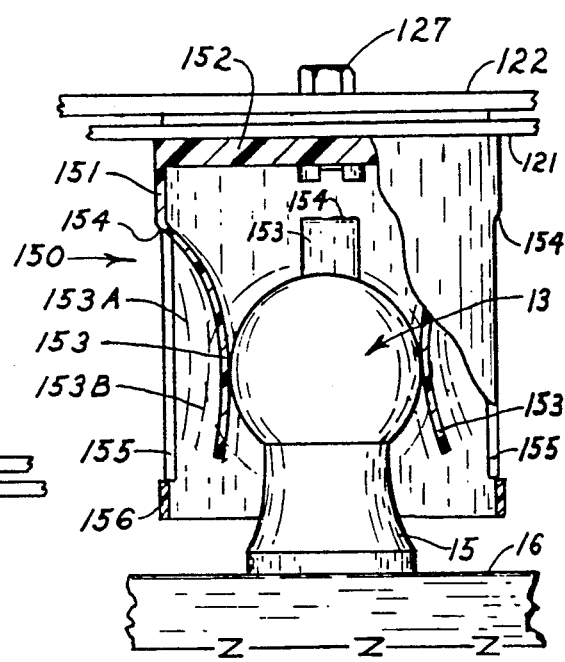
FIG. 23 is a fragmentary elevational view of another modified second target of a type similar to FIG. 20 with portions thereof broken away for clarity of illustration.

Another modification of the socket connector having capability of cooperatively receiving and engaging with any of the commonly dimensioned ball joints 13 is shown in FIG. 23. This modified connector 150 is also of a type adapted to be disposed on a ball joint in retained relationship for support of the longitudinal and transverse guidance elements in proper operative relationship to provide guidance to the vehicle operator. It comprises a cylindrical tube 151 having an integrally formed top end wall 152 with the tube being of a diameter that is larger than the diameter of the largest ball joint that is adapted to be axially received therein. Mechanical securing of a ball joint therein is effected by a plurality of spring fingers 153. These fingers, four in the illustrative embodiment, are elongated strips formed as struck out portions of the tube and which remain attached to the tube as at their upper ends 154 with capability of being flexed, relatively inward and outward through the respective slots 155 from which they are formed. By forming the tube from a suitable metal or plastic material exhibiting an appropriate resilience characteristic, these fingers 153 can be formed in an arcuate shape projecting inwardly of the tube's wall 151 to an extent necessary to mechanically interengage with a ball joint 13 as is shown in FIG. 23. With the fingers formed to engage with a ball joint of the smallest diameter in resiliently gripping engagement, they will inherently flex inwardly to a relatively greater degree, as is diagrammatically shown in FIG. 23, to the positions shown by the broken lines designated 153A or 153B. In this embodiment, the slots 155 do not open at the bottom of the tube, thereby leaving a continuous bottom peripheral ring 156 which maintains the structural integrity of the tube for purposes of better assurance that the tube will maintain its shape when being applied to or removed from a ball joint.

When applying the modified connector socket 150, the operator merely pushes the tube downwardly over the ball joint bringing the outwardly flared lower end portions of the fingers 153 into engagement with the ball. Continued downward movement causes the fingers to ride over the surface of the ball and flex the fingers outwardly. When the fingers are flexed outwardly to their furthest extent, they will be in engagement with the surface of the ball where they will tend to maintain the tube at a fixed vertical elevation with respect to the ball. It is not necessary that the tube 152 be pushed further downwardly; although, if desired, the tube may be of a length whereby its lower end may be brought into contact with and vertically supported on a component of the supporting frame 16 for the hitch assembly as is the case with the connector socket shown in FIG. 20.

It is to be noted that a spring finger type connector socket may be constructed in a manner different from that shown in FIG. 23, but still employing the same general concepts and principles of spring fingers for gripping of a ball joint. As an example of a variation of the illustrative concept, the spring fingers may be formed as elements separate from the elongated tube and then mounted within and carried by the tube. These spring fingers may be formed as individual elements or they may be formed as a multifinger unit. In the case of a multifinger unit, pairs of arcuately curved fingers may be fabricated in a U-shaped configuration with two such units secured together at the base of the U and also secured to the interior upper end wall of the connector tube in a downwardly opening, cup-shape adapted to resiliently engage with a ball joint. As an alternative construction, the arcuately curved spring fingers may be secured to or integrally formed with a circular base ring that is secured to the interior of the tube and positioned with the fingers projecting either upwardly or downwardly with respect to their point of connection to the tube. Also, the tube may be essentially eliminated retaining only the upper end wall for mounting of the fingers or the fingers may be secured directly to the lower one of the two guidance elements. However, retaining the elongated tube shown in the modifications of the FIG. 23 type, or FIG. 22, is advantageous in that the tube serves to retain the grease that is applied to a ball joint and prevent the grease from getting on the target elements.

Figure 24:
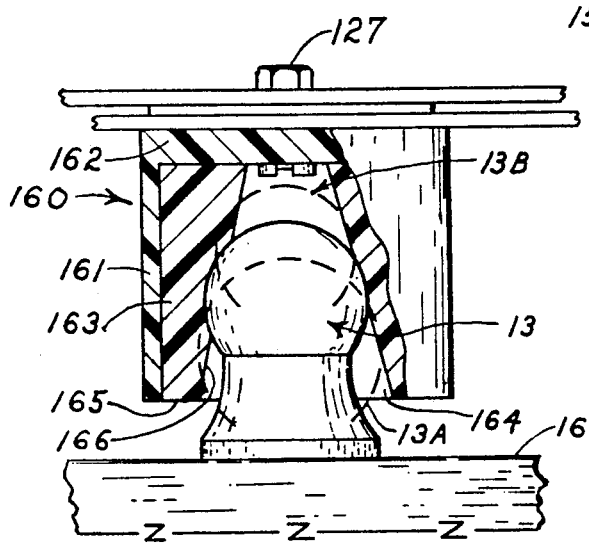
FIG. 24 is a fragmentary elevational view of yet another modified second target of a type similar to FIG. 20 with portions thereof broken away for clarity of illustration.

Another modification of a connector socket of the type shown in FIGS. 19-20 is shown in FIG. 24. This modification comprises a connector socket 160 which is also of a design that is capable of cooperatively engaging with any of the standardized size ball joints in support of the second target in operative association with that component of the hitch assembly. This connector socket 160 includes a cylindrical tube 161 adapted to be disposed in vertically oriented relationship to a ball joint 13 coaxially received therein and closed at its upper end by an integrally formed top end wall 162. The longitudinal and transverse guidance elements 121 and 122 are secured to that top end wall in the same manner as that shown in FIG. 20 and described with respect thereto and includes the pivot mechanism designated generally by the numeral 127. Disposed within the tube 161 is a ball-gripping insert 163 formed from a foamed rubber or plastic material exhibiting an appropriate resilience characteristic. This insert which is secured within the tube 161 either by a frictional interference fit or by adhesive bonding, or both, is constructed with a centrally located cavity 164 configured and dimensioned to receive the ball joint 13. The cavity 164 which extends coaxially with respect to the cylindrical tube is of a frusto-conical shape opening at its bottom end 165 in the same direction as does the cylindrical tube 161. It has an upwardly converging wall 166 that is inwardly convergent in an upward direction to contactingly engage with the different diameter ball joints at axially spaced points in relationship in proportional relationship to their respective diameters as is diagrammatically shown in FIG. 24. It is to be noted that the convergence of the cavity wall is kept at a minimum angle that will readily permit insertion of a ball, but will not result in the socket 160 popping off as a consequence of interacting frictional and resilient forces. In positioning of this modified connector socket 160 onto a ball joint 13, it is first positioned on top of the ball joint to cause the ball to enter into the cavity 164. After the convergent wall 166 of the cavity comes into contact with the ball, the connector is forcibly pushed a further distance downwardly onto the ball causing it to compress adjacent portions of the resilient insert 163, thereby deforming the respective portion of the convergent wall 166 and forming a circumferential channel that cooperatively engages with the ball. This results in a mechanical interengagement with frictional surface contact that functions to maintain the socket connector on the ball in vertical, upright relationship thereto, but readily removable therefrom.

In FIG. 24, a ball joint 13 of the intermediate standardized size diameter is shown in full lines in associated engagement with the insert 163. Both the larger and smaller sized ball joints are diagrammatically shown in broken lines and designated by the numerals 13A and 13B, respectively, illustrating the universal size capability of this socket connector. It is to be noted that the relative positions of the ball joints are not of a fixed nature as a ball may be pressed into the insert to either a greater or lesser degree and thus result in a ball being at a different axial position than is shown in FIG. 24.

Removal of a second target 32 having a socket connector of any of the configurations shown in FIGS. 20-24 from a ball joint 13 is effected by vertical displacement and thus requires the ball-receiving socket 14 along with associated components of the trailer frame 19 to be elevated to a sufficient extent to provide the necessary vertical clearance. A greater vertical clearance is required with these connector socket-type of target mountings than is necessary for the target structure shown in FIGS. 8, 9 and 10, but during the course of removal, the connector sockets can be tilted laterally to a certain extent to minimize the vertical clearance that is required.

It is to be understood that the mechanical mechanisms illustrated in FIGS. 8, 9, 10 and 20-24 and described for mounting of a second target in operative association with a ball joint are not the only mechanisms that may be devised and used. Also, the socket-type connectors may be otherwise constructed to enable them to be applied and removed from the ball joint through lateral movement rather than through vertical displacement.

In initially illustrating the utility of this invention, the towing vehicle 10 was described as an auto having a single rearwardly facing window 18. While a single rear window provides a generally unobstructed view, there are other types of vehicles embodying designs which tend to obstruct to a significant degree an operator's view of the trailer and interfere with viewing of the target images in the mirror. An example of such a vehicle that exemplifies this problem is the typical van provided with a pair of doors at the rear resulting in formation of a centrally located, vertical post structure formed by the side frame members of the door with a window disposed at either side. Although this center post structure generally is not very wide, perhaps being of the order of four inches, it is nevertheless disposed on the center longitudinal axis in direct line with the operator's line of sight if the vehicle's rearview mirror is used. The operator can elect to turn around and look directly rearward toward the mirror and this angular viewing may effectively avoid the center post structure. Alternatively, the operator may find it expedient to open the rear doors, thereby eliminating the center post structure and providing an unobstructed view of the mirror.

It is also possible to modify the structure for support of the mirror so as to enable the mirror to be disposed in laterally offset relationship to the longitudinal axis of the trailer. This could be accomplished by modifying the structure shown in FIGS. 17 and 18 to enable the horizontally extending arm to be swung to an outwardly angled position and the mirror then pivoted to a position aligned with the longitudinal axis of the vehicles, that is, the longitudinal axis of the mirror is disposed parallel to the longitudinal axis of the trailer. This could be readily accomplished by either making the horizontal arm of a jointed construction or the vertical element as a round rod that is secured by a mounting bracket enabling it to be pivoted about its vertically extending axis. A lateral offset of the mirror such as to the extent of the width of the mirror does not materially affect the operator's view of the target images since the convex mirror effectively captures the images. However, those images are now viewable along a longitudinal path that by-passes any usual post structure that may be formed by the rear doors of a van-type towing vehicle.

The hitch assembly specifically shown in illustrating and describing this invention is of the ball joint type, but the utility of this novel optical target system is not limited to that specific mechanical structure. For example, the lunette and pintle hitch assembly commonly used in the industrial and construction industry is equally adaptive to use of this optical target system. Other trailer and towing vehicle combinations with their respective hitch assembly components may also advantageously utilize an optical target system embodying the disclosed invention. It is understood and recognized that various structural modifications may be required to adapt this invention to specific hitch assemblies or to particular towing and towed vehicle combinations, but any such modifications as may be necessary for a specific application will be readily apparent from the suggestions or disclosure of modifications that have been illustrated and/or disclosed herein.

In describing the illustrative embodiments of the first and second targets 31, 32 and the support standard 33, it was specifically noted that these components were designed to permit adjustment to enable their proper positioning and also to be placed in a compact configuration for storage. A system that is obtained for use by an individual for a specific towing and towed vehicle combination need not be returned in all of its aspects to the most compact configuration as determined by personal preferences and available storage. Also, a user of a system for a specific towing and towed vehicle combination may, for convenience and expediting set up of the system, elect to mark the components, when once initially set up, so that they may be readily returned to a predetermined optimum position.

It is readily apparent from the foregoing detailed description of an embodiment of this invention and modifications of various components thereof that a novel and particularly useful optical target system is provided to assist a vehicle operator in maneuvering of a towing vehicle with respect to a towed vehicle or trailer to effect alignment of the respective hitch assembly components and enable their mechanical interengagement. Provisions of first and second optical targets that are each removably mountable in fixed relationship to a respective one of the two mechanically interconnectable hitch assembly components greatly enhances the visual perceptibility of those components and identification of their reference points as imaged in a mirror by which the towing vehicle operator can readily determine how to maneuver the towing vehicle to effect vertical alignment of the hitch assembly components so that they may be mechanically coupled. With each of the optical targets having a longitudinal guidance element and a transverse guidance element that are of elongated configuration and capable of temporary orientation to central reference points or central vertical axes of the respective hitch assembly components, the vehicle operator is provided with elongated visual reference indicia rather than an essentially point-type reference that is otherwise available or afforded by the hitch assembly components. With such longitudinal and transverse guidance elements, the towing vehicle operator can very easily determine whether the longitudinal axes of the two vehicles are properly aligned by means of the longitudinal guidance elements and, if not, effect necessary correction and to then easily ascertain when the vertical axes of the two hitch assembly components are aligned by means of the transverse guidance elements.

Having thus described this invention, what is claimed is:

1. An optical target system for facilitating an operator's maneuvering of a towing vehicle having a hitch assembly component to position that component in cooperative alignment with a hitch assembly component carried on a forwardly extending tongue of a towed vehicle to enable mechanical interconnection of the hitch assembly components, said optical target system comprising A) a viewing mirror adapted to be supported in a position with respect to the towed vehicle to provide an operator of the towing vehicle with a visual image of the hitch assembly components during maneuvering of the towing vehicle for effecting alignment of the components as seen from a position substantially vertically above the hitch assembly components;

B) a first target positionable with respect to the towed vehicle's hitch assembly component and including longitudinal and transverse guidance elements disposed in a substantially horizontal plane and oriented to provide reference to a vertical axis extending through the towed vehicle's hitch assembly component; and C) a second target adapted to be carried on the towing vehicle and including longitudinal and transverse guidance elements disposed in a substantially horizontal plane and oriented to provide a reference to a vertical axis extending through the towing vehicle's hitch assembly component, said longitudinal guidance element positionable in a selected relationship to the longitudinal axis of the towing vehicle.

2. An optical target system according to claim 1 which includes a support standard having attachment means for detachably securing of said support standard to the towed vehicle in fixed relationship above the towed vehicles tongue, said first target being carried by said support standard.

3. An optical target system according to claim 2 wherein said attachment means includes an elongated channel adapted to cooperatively interfit with a vertically extending jackstand of said towed vehicle and positionable at a selected elevation thereon, and strap means secured to said channel and adapted to encircle the jackstand for detachably clamping of said channel thereto and securing of said support standard at a selected elevation.

4. An optical target system according to claim 2 wherein said support standard includes an elongated bar positionable in parallel relationship to the longitudinal axis of the towed vehicle and having a forward end portion adapted to project forwardly in overlying superposed relationship to the hitch assembly component of the towed vehicle.

5. An optical target system according to claim 4 wherein the forward end portion of said elongated bar forms the longitudinal guidance element of said first target.

6. An optical target system according to claim 5 wherein said first target includes a connector secured to said elongated bar on its forward end portion and carrying the transverse guidance element of said first target.

7. An optical target system according to claim 6 wherein said connector is longitudinally displaceable with respect to said elongated bar to a selected position thereon.

8. An optical target system according to claim 7 wherein said first target's transverse guidance element is pivotably secured to said connector for rotation in a substantially horizontal plane.

9. An optical target system according to claim 4 wherein said first target includes a connector secured to said elongated bar on its forward end portion and longitudinally displaceable with respect thereto to a selected position, said first target's longitudinal and transverse guidance elements secured to said connector.

10. An optical target system according to claim 9 wherein said first target's guidance elements are pivotably secured to said connector for rotation in a substantially horizontal plane.

11. An optical target system according to claim 2 wherein said viewing mirror is mounted on said support standard by a mirror support bracket, said mirror support bracket including an elongated standard adapted to be disposed in upwardly projecting relationship to the towed vehicle's tongue and an arm carried at the upper end of said elongated standard in laterally projecting relationship thereto and on which said mirror is mounted, said elongated standard being telescopically adjustable with respect to its longitudinal axis to enable positioning of said mirror at a selected elevation above the towed vehicle's tongue.

12. An optical target system according to claim 11 wherein said support standard includes adjustment means selectively adjustable in a horizontal direction to enable positioning of said mirror support bracket at a location where said viewing mirror is disposed substantially vertically above the towed vehicle's hitch assembly component.

13. An optical target system according to claim 1 which includes a support standard having attachment means for detachably securing of said support standard to the towed vehicle in fixed relationship above the towed vehicles tongue, said viewing mirror being mounted on said support standard by a mirror support bracket, said mirror support bracket including an elongated standard adapted to be disposed in upwardly projecting relationship to the towed vehicle's tongue and an arm carried at the upper end of said elongated standard, said arm projecting a distance laterally outward from said standard with said mirror being mounted on said arm whereby said mirror will be supported a distance above said towed vehicle's tongue and at a position with respect to its hitch assembly component whereby that component will be imaged in said mirror for viewing by the operator of the towing vehicle.

14. An optical target system according to claim 13 wherein said elongated standard is telescopically adjustable with respect to its longitudinal axis to enable positioning of said mirror at a selected elevation above the towed vehicle's tongue.

15. An optical target system according to claim 13 which includes horizontal adjustment means enabling selective displacement of said mirror along the longitudinal axis of the towed vehicle to a selected position with respect to its hitch assembly component.

16. An optical target system according to claim 13 wherein said mirror is mounted on said arm to be supported in a position with its effective optical reflecting surface disposed in a plane angularly oriented to both vertical and horizontal planes.

17. An optical target system according to claim 16 wherein said mirror is mounted on said arm by pivot means enabling rotation about a substantially vertical axis.

18. An optical target system according to claim 1 wherein said longitudinal and transverse guidance elements of each of said first and second targets are elongated elements having flat upwardly facing surfaces of predetermined widths.

19. An optical target system according to claim 18 wherein said first target's transverse guidance element is shorter than said second target's transverse guidance element.

20. An optical target system according to claim 18 wherein said guidance elements are formed with their upwardly facing surfaces having enhanced optical reflectivity.

21. An optical target system according to claim 1 wherein said second target includes mounting means for removably securing it in operative relationship to the towing vehicle's hitch assembly component.

22. An optical target system according to claim 21 wherein said mounting means includes vehicle interconnection means carried by said second target's longitudinal guidance element adjacent one end thereof, said interconnection means adapted to detachably engage with the component of the towing vehicle.

23. An optical target system according to claim 22 wherein said interconnection means is a magnet.

24. An optical target system according to claim 21 wherein said second target's longitudinal guidance element is adapted to be disposed in superposed, vertically supported relationship on top of the towing vehicle's hitch assembly component, said second target including stabilizing means mechanically engageable with said hitch assembly component to aid in maintaining said second target in its superposed position with respect thereto.

25. An optical target system according to claim 21 wherein said second target includes a connector mechanically securing together said second target's longitudinal and transverse guidance elements, said connector slideably engaged with said second target's longitudinal guidance element enabling displacement therealong to a selected axial position.

26. An optical target system according to claim 25 wherein said second target's connector includes a pair of downwardly projecting legs at respective sides for receiving a portion of the towing vehicle's hitch assembly component therebetween in mechanically coupled relationship.

27. An optical target system according to claim 25 wherein said second target's transverse guidance element is pivotally mounted on said second target's connector for rotation between positions longitudinally aligned with and transversely oriented to said second target's longitudinal guidance element.

28. An optical target system according to claim 1 which includes a support standard having attachment means for detachably securing of said support standard to the towed vehicle in fixed relationship above the towed vehicle's tongue, and wherein said first target is carried by said support standard,
said viewing mirror is mounted on said support standard by a mirror support bracket, said mirror support bracket including an elongated standard adapted to be disposed in upwardly projecting relationship to the towed vehicle's tongue and an arm carried at the upper end of said elongated standard, said arm projecting a distance laterally outward from said standard with said mirror being mounted on said arm whereby said mirror will be supported a distance above said towed vehicle's tongue and at a position with respect to its hitch assembly component whereby that component will be imaged in said mirror for viewing by the operator of the towing vehicle,
said longitudinal and transverse guidance elements of each of said first and second targets are elongated elements having flat upwardly facing surfaces of predetermined widths, and
said second target includes mounting means for removably securing it in operative relationship to the towing vehicle's assembly component.

29. In combination with a towing vehicle and a towed vehicle each having respective components of a hitch assembly that are mechanically interengageable for detachably coupling said vehicles together;

an optical target system for facilitating an operator's maneuvering of said towing vehicle to position its hitch assembly component in cooperative alignment with the hitch assembly component of said towed vehicle to enable mechanical interconnection of said components, said optical target system including A) a viewing mirror adapted to be supported in a position with respect to said towed vehicle to provide an operator of said towing vehicle with a visual image of said hitch assembly components during maneuvering of said towing vehicle for effecting alignment of said components as seen from a position above said hitch assembly components;

B) a first target positionable with respect to said towed vehicle's hitch assembly component and including longitudinal and transverse guidance elements disposed in a substantially horizontal plane and oriented to provide reference to a vertical axis extending through said towed vehicle's hitch assembly component; and C) a second target adapted to be carried on said towing vehicle and including longitudinal and transverse guidance elements disposed in a substantially horizontal plane and oriented to provide a reference to a vertical axis extending through said towing vehicle's hitch assembly component, said longitudinal guidance element positionable in a selected relationship to the longitudinal axis of said towing vehicle.

* * * * *